United States Patent [19]

Cotic et al.

[11] 4,161,655

[45] Jul. 17, 1979

[54] MULTI-CELL DETECTOR USING PRINTED CIRCUIT BOARD

[75] Inventors: Dennis J. Cotic; David M. Hoffman, both of Milwaukee; Peter S. Shelley, Brookfield; Laurel J. Zech, Milwaukee, all of Wis.

[73] Assignee: General Electric Company, Schenectady, N.Y.

[21] Appl. No.: 855,532

[22] Filed: Nov. 28, 1977

[51] Int. Cl.$^2$ .................... G01T 1/18

[52] U.S. Cl. .................... 250/385; 250/374; 339/17 R; 361/397

[58] Field of Search .................... 250/336, 385, 360, 374, 250/389; 461/397, 400, 408; 339/17 E, 17 R, 17 B

[56] References Cited

U.S. PATENT DOCUMENTS

| | | | |
|---|---|---|---|
| 4,029,373 | 6/1977 | Jones et al. | 339/17 R |
| 4,031,396 | 6/1977 | Whetten et al. | 250/385 |
| 4,119,853 | 10/1978 | Shelley et al. | 250/385 |

*Primary Examiner*—Alfred E. Smith
*Assistant Examiner*—Carolyn E. Fields
*Attorney, Agent, or Firm*—Ralph G. Hohenfeldt

[57] ABSTRACT

An array of electrode plates are arranged in parallel and spaced apart relationship to define ionization cells in a channel within a housing that is occupied by high pressured gas. A broad beam of x-ray photons penetrates a window in the housing and produces ionization events that result in analog signals corresponding with photon energies and intensities. Conduction of the signals from the interior to the exterior of the detector housing is accomplished with a printed circuit board assembly that is sealed between the housing and its cover.

8 Claims, 10 Drawing Figures

14
11
19
15
3
3
17
16
20
15
15
18
23

42
25
34
36
31
30
41
32
29
27
38
28
26
33

11
12
14
13
10
15
16
22
21
15
23

MULTI-CELL DETECTOR USING PRINTED CIRCUIT BOARD

BACKGROUND OF THE INVENTION

This invention relates to multi-cell detectors for ionizing radiation such as x-radiation. The improved detector is generally applicable to detecting photon intensity distribution in a broad beam of x-rays and it is especially useful in x-ray computerized axial tomography systems.

In the computerized axial tomography process, a spatial distribution of x-ray photon intensities emerging from a body under examination is translated into discrete analog electric signals which are processed in a manner that enables reconstructing the x-ray image and displaying it as a visible image. Background information on the process is given in an article by Gordon et al, "Image Reconstruction From Projections", Scientific American, October 1975, Vol. 233, No. 4.

In some tomography systems, the x-ray beam is fan-shaped and diverges as it exits from the body being examined whereupon the beam falls on an array of detector cells such that photon intensities over the front of the beam can be detected and resolved spatially. Each active detector cell comprises at least a pair of electrode elements such as a pair of parallel thin metal plates. The x-ray source and detector orbit around an examination subject jointly. The individual detector cells are arranged in an array so that the x-ray photons distributed across the beam at any instant are detected simultaneously. The signals correspond with x-ray absorption along each ray path at the instant of detection. Additional sets of signals are obtained for a sequence of angular positions of the orbiting detector and x-ray source. The discrete analog signals are converted to digital signals and processed in a computer which is controlled by a suitable algorithm to produce signals representative of the x-ray absorption or attenuation of each small volume element in the body through which the x-ray beam passes. The analog signals are generally in the low nanoampere range. Careful attention must be given to maintaining an adequate signal-to-noise ratio.

A typical x-ray detector for use in a computerized axial tomography system that employs a broad front fan-shaped beam will usually require 300 or more individual detector cells to get adequate resolution. Hence, a conductor must be provided for each cell for conducting simultaneously produced signals from the inside of the detector housing to the preamplifiers of the data acquisition system electronic circuitry.

One prior method of conducting the analog signals from the individual cells uses insulating electric feed-throughs set in the cover of the detector housing. Each signal producing electrode comprising a cell has a fine lead wire spot welded to it and extending from it. Hundreds of solder connections had to be made as a result of having to run individual wires or a ribbon cable between each of the fine lead wires and the feed-throughs in the cover while the cover was held proximate to the electrode array. The wires extending from the fine leads on the electrode plates to the feed-throughs had to be long enough to provide sufficient clearance for making the solder connections at both ends. After the connections are made, the leads between the electrodes and the feed-throughs are folded into the electrode array housing and the cover is bolted onto the housing to effect a gas-tight seal. Another set of conductors are then connected to the outsides of the feed-throughs for sending the signals to the data acquisition and processing system.

One disadvantage of the approach just outlined is that the long leads between the electrodes and feed-throughs inside the housing had to be flexible and, hence, were subject to vibrations when the detector was used in x-ray tomography apparatus. Vibrations increase production of electric noise. Another disadvantage is that one end of each lead wire had to be soldered to one of the feed-throughs and the other end had to be soldered to the fine lead wires from the electrodes while the cover was held in spaced relationship with respect to the electrode array and before the cover could be applied to the detector housing. The soldering had to take place under very inconvenient circumstances.

SUMMARY OF THE INVENTION

An object of the present invention is to overcome the above noted and other disadvantages by using a printed circuit board assembly to conduct signals from the inside to the outside of the multi-cell detector.

Another object is to minimize the number of electric connections that must be made interiorly of the detector housing.

Still another object is to reduce electric noise in the signal conducting circuitry of a multi-cell detector.

A further object is to make connecting the lead conductors rapid and easy in a multi-cell detector.

In accordance with the invention, in a radiation detector that comprises a body providing a chamber for containing gas, a plurality of elements in the chamber responsive to radiation entering it by producing electric signals, and a cover for being joined with the body to close said chamber, there are improved means for providing electric circuits from said elements inside of the chamber to its outside. The improved means comprises a circuit board assembly for being disposed sealingly between the cover and the housing and including an insulating base having a plurality of adjacent conductive strips adhered to it and each of which has a portion inside and a portion outside of the chamber and means for making electrical connections between said elements and the portions of the strips which are inside of said housing.

How the foregoing and other more specific objects of the invention are achieved will appear in the more detailed description of a preferred embodiment of the improved multi-cell detector which will now be set forth in reference to the drawings.

DESCRIPTION OF A PREFERRED EMBODIMENT

Figure 1:
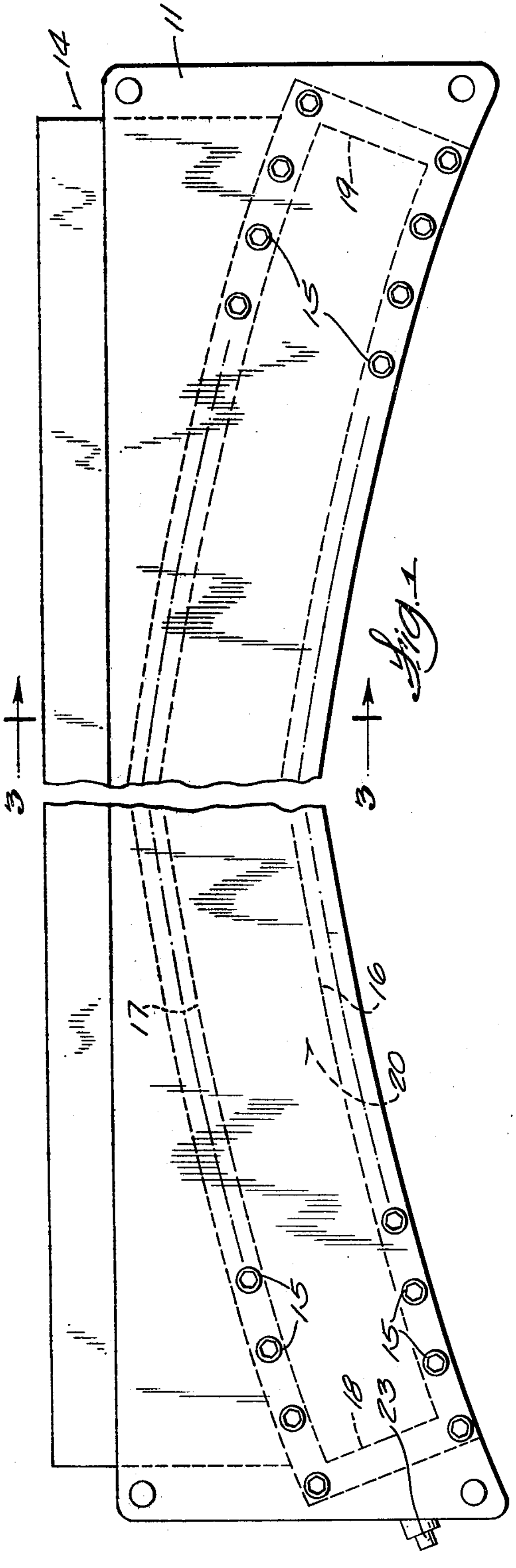
FIG. 1 is a plan view of a multi-cell detector which employs the new circuit board means for conducting the signals.
Figure 2:
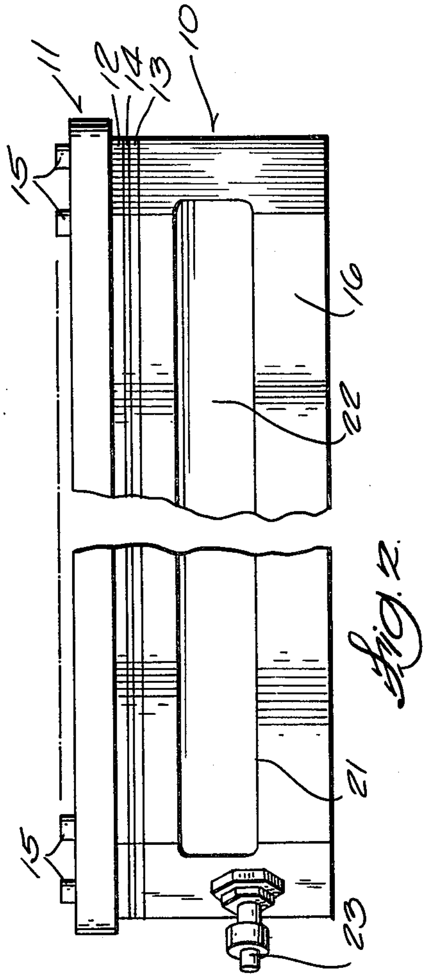
FIG. 2 is a front elevation view of the detector shown in the preceding figure.

Referring to FIGS. 1 and 2, the multi-celled detector comprises a metal body or housing 10 on which there is a metal cover 11 and between which there are two gasket assemblies 12 and 13 with the printed circuit board assembly 14 interposed between them. Cover 11 is secured to housing 10 with a plurality of machine screws such as those which are marked 15. Tightening the machine screws results in gas-tight seals being formed at the interfaces of the cover and circuit board and the circuit board and the housing.

Terms such as top, bottom, ends and the like are used herein to help the reader relate the description to the drawings and are not to be construed as physical limitations since the detector to be described can be used in any attitude.

In FIGS. 1 and 2 the detector housing may be seen to comprise a front wall 16, a rear wall 17 and end walls 18 and 19. These walls appear in dashed lines in FIG. 1 and define an elongated curved channel or chamber 20 which has its top opening closed by cover 11. A portion of the substantially planar printed circuit board assembly 14 extends rearwardly beyond cover 11 in FIG. 1. The details of this board will be described later.

In the front wall 16 of the housing 10, there is a recess or slot 21, as can be seen in FIG. 2, which is substantially coextensive in length with the curved internal housing chamber 20. The recess results in the front wall being reduced in thickness to provide an elongated x-ray permeable window 22. The window 22 should be comprised of a low atomic number metal such as aluminum to minimize attenuation of incident x-ray photons.

One may see in FIGS. 1 and 2 that the housing 10 is provided with a fitting 23 which is for evacuating the housing when its cover is on after which it is filled with gas by means of the fitting. In multi-cell x-ray detectors for use in computerized axial tomography, a high atomic number gas such as xenon at a pressure of about 25 atmospheres is used, but other gases and pressures could be used that are suitable for energy of the photons which are being detected.

Figure 3:
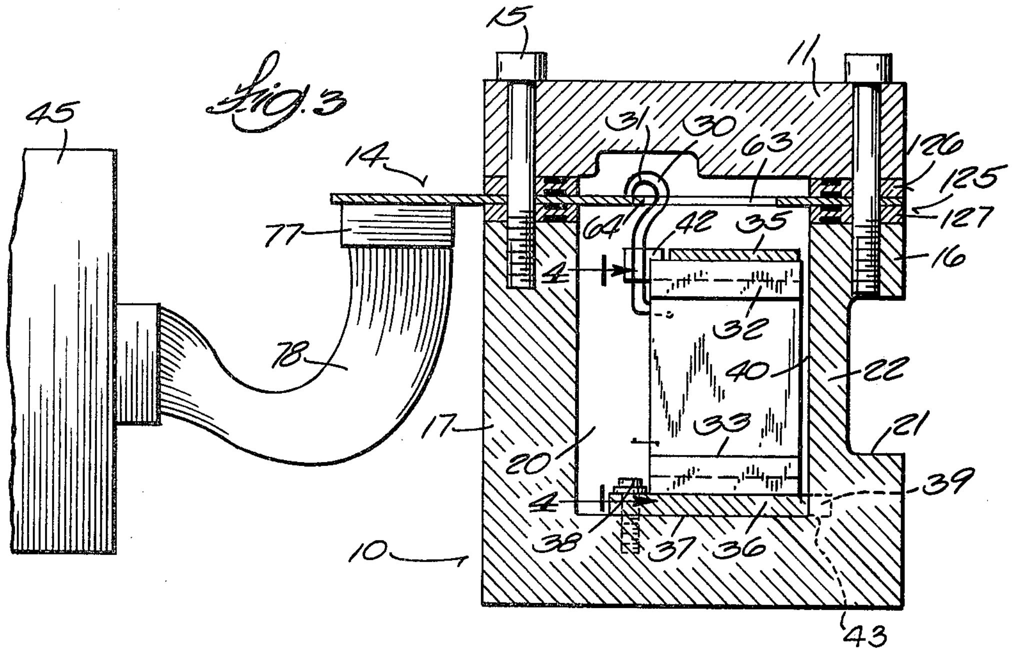
FIG. 3 is a vertical section taken along a line corresponding with 3—3 in FIG. 1.

In FIG. 3, a vertical section of the detector is shown. Here one may see a side view of one of the electrode plates 25 in the array of plates which are disposed along channel-shaped chamber 20 and which, in pairs, constitute the individual detector cells. An edge view of some of the electrode plates appears in FIG. 4. A pair of typical active electrode plates are marked 26 and 27 in FIG. 4. A bias electrode plate 28 is disposed between them. This alternation of plates is typical for the whole array. The spaces such as 29 between an active electrode plate 26 and a bias electrode plate 28 constitute a gas-filled detector cell in which ionizing events take place and in which analog signals are produced having magnitudes depending on the intensity and energy of the x-ray photons that traverse the gas between the plates. The analog signals that result from electron-ion pair production are conducted out by fine wires such as those marked 30 and 31 in FIG. 4. These wires are spot-welded at one end to respective active electrodes such as 26 and 27 that have a bias electrode plate 28 intervening between them. All of the bias electrodes in this example are connected to a common lead wire 34 which leads to outside of the detector housing. The electrodes could be variously shaped and arranged in other designs. The foregoing illustrative examples are given to provide a setting for the new manner of connecting the electrodes to complete circuits with the outside of the detector. It should also be understood that means are provided for applying a potential difference between electrodes as is typical of detectors of the ionization chamber type.

By way of example and not limitation, in one commercialized detector design the electrode plates such as those marked 26–28 are of tungsten six mils (0.006 inch) thick. The plates are not exactly parallel but are on a radius that conforms with that of a fan-shaped x-ray beam which is detected. The cells are separated by 47.5 mils (0.0475 inch), approximately. In this illustrative design, there happens to be approximately 320 detector cells in the array. Other numbers of cells and other plate thicknesses are used in some versions of the detector.

Figure 4:
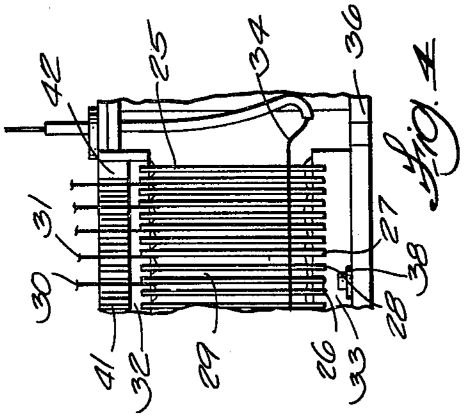
FIG. 4 is a rear view of a part of an electrode array in the detector as viewed generally in the direction of the arrows 4—4 in FIG. 3.

In FIG. 4, one may see that the fine lead wires such as 30 and 31 extending from the active electrode plates pass through grooves 41 on the back side of an insulating strip 42 which is L-shaped in cross section and is bonded to the upper face of the slotted insulating member 32 as can be seen in FIG. 3. In that figure, only one pair of upstanding fine wire leads 30 and 31 is visible. These leads are in alternate adjacent grooves 41 all along upper insulating member 42. As shown in FIGS. 3 and 4, the lower edges of electrode plates 26–28 are set in a slotted insulating strip 33. FIG. 3 shows lower insulating strip 33 bonded to a base plate 36 which has tongues 39 on one edge that extend into a groove 43 in the inside wall surface 40 of the channel 20. Screws 38 are used to press the base plate 36 against the bottom surface 37 of channel 20. The tongues stabilize the electrode assembly in channel 20 and assure that the front edges of the electrode plates will be held at a constant distance from wall surface 40. The upper slotted insulating strip 32 is bonded to a flat bar 35 which is anchored at its opposite ends in channel 20 by means which are not shown in FIG. 3.

The structure which has been described thus far is known and is described in greater detail in a copending application Ser. No. 804,980, filed June 9, 1977, now U.S. Pat. No. 4,119,853, which is assigned to the assignee of this application.

Now to be discussed is the manner in which electric connections are made, between the multitude of fine wires such as 30 and 31 standing in staggered rows inside of chamber 20, to the data acquisition system module 45 outside of the housing using the printed circuit board assembly 14 as in FIG. 3.

Figure 5:
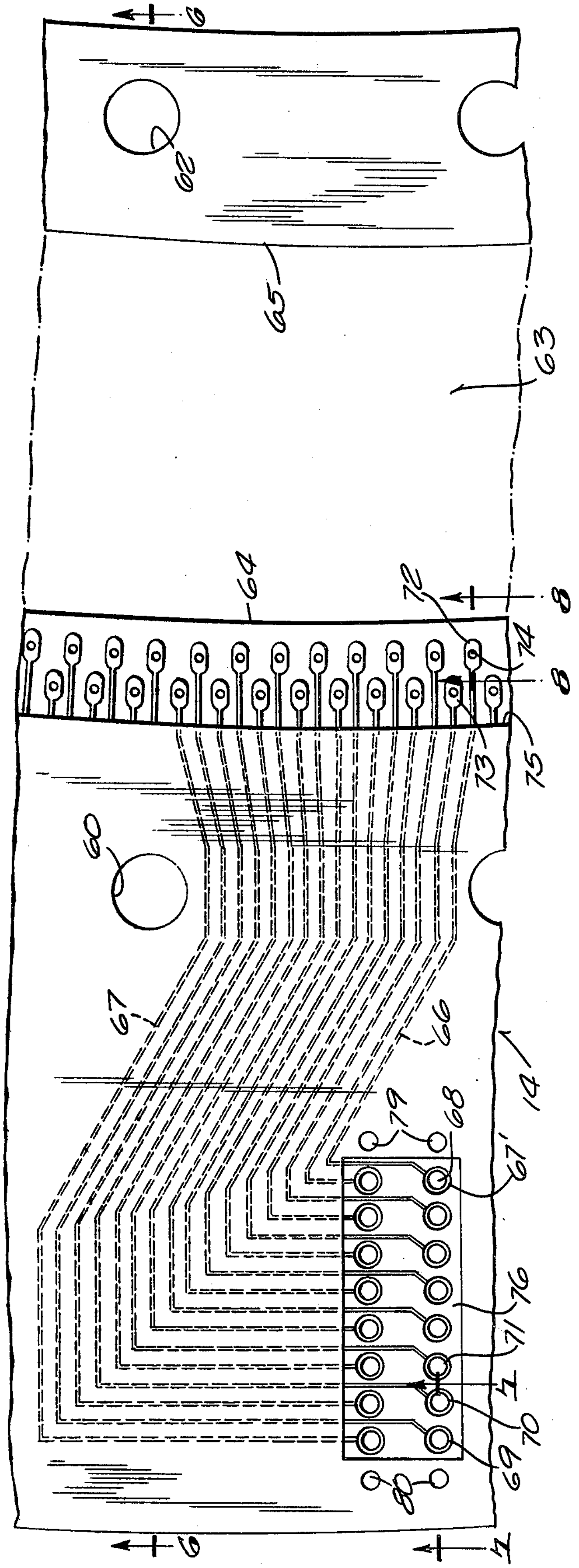
FIG. 5 is a plan view of a portion of one embodiment of the printed circuit board assembly used for conducting the signals from a multi-cell detector.
Figure 6:
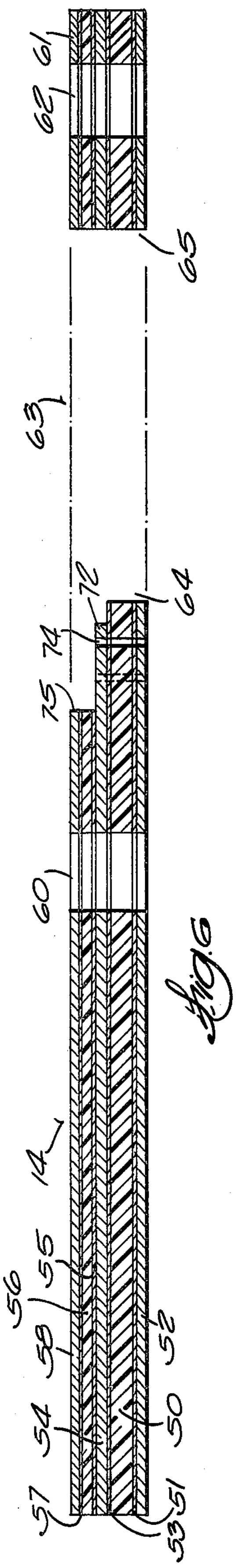
FIG. 6 is a section of the printed circuit board 6—6 in FIG. 5.

A transverse section of one embodiment of the laminated printed circuit board assembly 14 is depicted in FIG. 6 where the thicknesses of the various layers are magnified for the sake of clarity. A plan view of a portion of the board is shown in FIG. 5. In FIG. 6, one may see that the basic laminated board comprises a base plate or board 50 which may be made of one of several materials that are commonly used for making printed circuit boards. For instance, the board may be comprised of a material commonly known as FR-4 which is epoxy resin with glass cloth reinforcement. FR-2 or FR-3 may also be used and these are, respectively, paper reinforced phenolic resin and paper reinforced epoxy resin. Typically, by way of example and not limitation, type FR-4 board about 0.031 inch thick was found to be a suitable base 50 for one version of the connector assembly. Just to illustrate roughly the extent to which the thicknesses of the layers have been magnified for the sake of clarity, in reality, the total thickness of the laminated structure 14 will usually be under one-eighth of an inch. Except for the base 50 which is relatively thick, the other layers might be more aptly characterized as metal and insulating material films.

In FIG. 6, adhered to the bottom of base 50 with a thin film of adhesive 51 is a metal film 52, usually copper, which covers most of the face of baseboard 50. This metal film is a ground conductor which facilitates grounding to drain off stray signals and also serves as a shield against environmental electric noise. On top of base 50 in FIG. 6, there is another thin film of adhesive 53 for bonding the next lamination 54 of metal film, preferably copper. Metal film 54 is actually etched to form a plurality of individual conductive strips as will be shown further. After another adhesive film 55, there is a thin layer of insulating material 56 which is preferably a material that does not degrade at the temperatures required for soldering. A suitable insulating film material is that which is known by the trademark "Kapton". Adhered to the insulating layer 56 with an adhesive film 57 is a topmost metal film 58 such as copper. It should be obvious that the layers might be bonded together by means other than by adhesive.

The board assembly 14 has a left section, as viewed in FIG. 6, in which there are a row of bolt holes 60 and a right margin 61 in which there are a row of bolt holes 62. The bolt holes enable clamping the laminated board 14 of FIG. 6 between cover 11 and housing 10 of the detector. The board 14, which is closed at its ends, nevertheless has a gap 63 which lies over the top of the chamber or channel 20 in the housing when the detector is assembled as in FIG. 3. The inner edge of the gap is marked 64 and the outer edge is marked 65.

As mentioned earlier, the thin metal film layer 54 is, in reality, etched to define a plurality of conductive strips which appear as dashed lines in FIG. 5. The embedded conductors conduct the individual analog signals from the inside to the outside of the detector body. Two of the conductors are marked 66 and 67 in FIG. 5 for purposes of identification but it will be evident that there are several other parallel conductors between those which are identified in FIG. 5. The line of sight to conductors 66–67 in FIG. 5 would be through top copper film 58, adhesive film 57, insulating film 56 and adhesive film 55. A typical conductor strip 66 in FIG. 5 terminates outside of the detector housing in a land or circular conductive pad 67' which surrounds a hole 68 that extends through the laminated board and has its inner surface plated with metal. Other outside lands in FIG. 5 are marked 69, 70 and 71 for purposes of identification. The inside ends of typical conductor strips, such as the one marked 66, terminate in pads or lands such as those marked 72 and 73 in FIG. 5.

As can be seen in FIGS. 5 and 6 at the inner end region of the board, the thin copper grounding film 58 and underlying Kapton or other insulating film 56 are removed or set back to produce the clear area beginning at edge 75 to let the lands such as 73 and 72 at the ends of the signal conductors be exposed to enable soldering when fine lead wires such as 30 and 31 from the electrode plates are passed through the holes 74 in the lands which are inside of the detector housing after its cover is installed.

It should be noted that a rectangular opening 76 is made through the top copper film 58 and the underlying insulating film 56 to expose the lands such as the one marked 67' and its associated internally metallized through-hole 68. The holes in the two rows which include the one marked 68 are for accepting the pins of solderable connectors such as the one marked 77 in FIG. 3 where the connector is joined by a flexible cable 78 which is one of several that conducts the analog signals to the data acquisition system 45 outside of the detector. Note also in FIG. 5 that there are pairs of holes 79 and 80 through all layers of the laminate at opposite ends of rectangular opening 76 which receive connector pins that lead to ground and contribute further toward grounding upper copper film 58 and lower copper film 52 for the purpose of minimizing electric noise.

Figure 8:
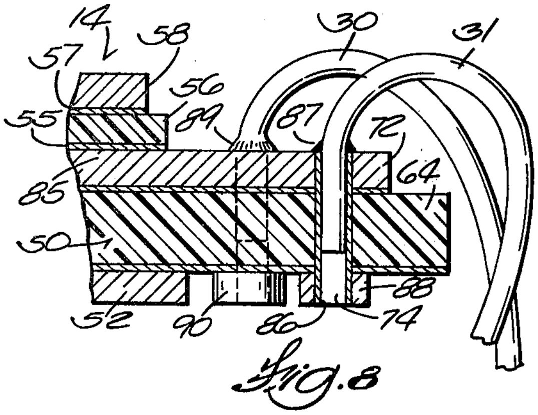
FIG. 8 is a magnified vertical section for illustrating the manner in which the electrical connections are made in a portion of the circuit board which is inside of the detector housing.

FIG. 8 is a further magnification of the section 8—8 in FIG. 5. It shows a section through the land 72 extending integrally from its associated conductor strip 85. One of the fine wires 31, which extends from an electrode plate in the electrode chamber 20, is inserted through hole 74 whose metallizing or plated coating is marked 86. The fine wire 31 appears to have the same diameter as the plated hole but it should be understood that the wire may fit loosely through the hole. The connections are made by soldering the wires to the lands or pads as illustrated by the solder fillet which is marked 87. The thin bottom copper film 52 is etched away to provide a bottom pad 88 which is isolated from the main area of copper grounding film 52. This pad enhances the integrity of the connection but it could be omitted as a sound connection is made by soldering.

Referring further to FIG. 8, the land at the end of the adjacent conductor strip, to which the next fine lead wire 30 is connected by means of solder fillet 89, lies behind and is set back from land 72. There is a pad 90 for wire 30 that has the same purpose as pad 88 for wire 31 as mentioned in the preceding paragraph. The conductor strip associated with this land lies behind and is electrically isolated from the conductor strip 85 as viewed in FIG. 8. How the lands and conductors are staggered is evident from inspecting FIG. 5.

It should be noted that the several hundreds of fine lead wires such as 30 and 31 in a row are brought up from the electrode plates in chamber 20 through the gap or opening 63 in the printed circuit board assembly 14 as is evident in FIG. 3. All soldering on the fine lead wires can be done from one side, that is, from the top side of the laminated printed circuit board assembly 14. Thus, all connections can be made interiorly of housing 10 after the circuit board is disposed on the housing and before cover 11 is applied.

Figure 7:
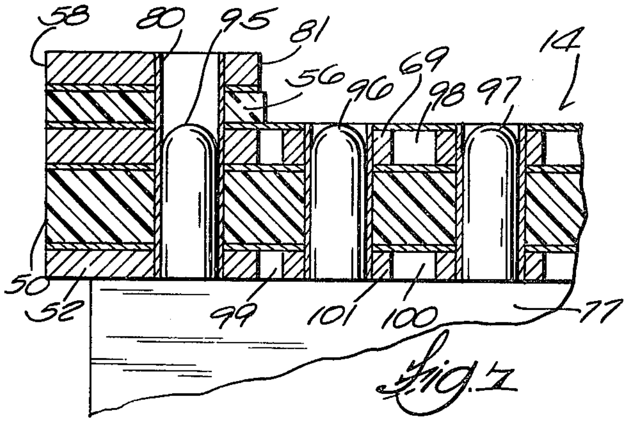
FIG. 7 is a magnified vertical section of the circuit board shown in FIGS. 5 and 6 for illustrating the manner in which electrical connections are made at the end of the board which is outside of the detector housing.

FIG. 7 shows a magnified vertical section of that part of the board assembly 14 on which the pins of the multiple pin connectors 77, shown in FIG. 3, solder into the outboard edge of the board assembly. Connector 77 and its counterparts, not shown, have flexible ribbon cables 78 extending from them to bring the signals from the circuit board conductors to the data acquisition system 45. Only one of the connectors 77 is shown in FIG. 3 but it will be understood that there are sufficient number of 20 pin connectors, in this case, deployed along the circuit board assembly, to handle all of the signal conductors from the interior of the detector housing.

The section in FIG. 7 is taken approximately on the line 7—7 in FIG. 5. In FIG. 7, some of the connector pins 95–97 are shown. The edge 81 of the cutaway copper film 58 that defines the rectangular opening 76 for the connector 77 in FIG. 3 is similarly marked in FIG. 7. Note that pins 95 insert in internally plated holes 80. Pins 95 lead to ground through ribbon cable 78. In FIG. 7, pins 95 are effectively connected to top copper grounding film 58 and bottom grounding film 52. Every effort is made to drain off stray charge to ground which could cause noise. Pins 96 and 97 in FIG. 7 are typical of those which conduct the analog signals from the circuit board assembly 14 to the data acquisition system 45. As shown in FIG. 5, a typical pin extends through a pad 69 which terminates a signal conductor. This pad and the signal conductor which it terminates has the copper around it etched away to provide isolating spaces, such as the one marked 98, so there is no cross connection between adjacent signal conductors. The lower copper grounding film 52 is also etched away as at 99 to 100 to let an electrically isolated pad 101 remain. The conductors associated with pin 97 and the other pins are similarly isolated.

Figure 10:
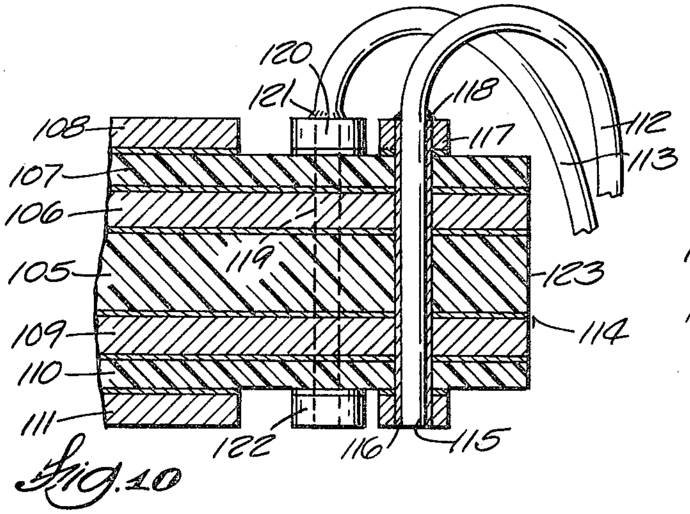
FIG. 10 is a fragmentary vertical section of an alternative embodiment of the printed circuit board.

An alternative embodiment constituting a fragment of a double-sided printed circuit board assembly is shown in FIG. 10. This type of board is used where the density of the detector cells and, hence, the number of conductors which must lead from them is very great. The basic laminated printed circuit board assembly in FIG. 10 may be composed of the same materials as are the films and layers in the previously described embodiment. Thus, in FIG. 10, there is a relatively thick insulating baseboard 105 located centrally in the laminated assembly. A copper film 106 out of which the multiplicity of individual signal conductors are etched is adhered to baseboard 105. An insulating film 110, which, again, may be Kapton or other insulating material that is not susceptible to damage by the heat of soldering, is adhered to conductor film 106. Finally, a copper film 108 which serves as an electric shield and ground conductor, as in the previously discussed embodiment, is adhered to insulating film 107. The bottom side of baseboard 105 has a metal film 109 of a material such as copper adhered to it. A plurality of conductive strips for conducting analog signals are etched out of film 109. These strips are covered by an insulating film 110. Adhered to insulating film 110 is another copper film 111 which is used for shielding and grounding. It will be evident from the description thus far that there are a plurality of strips for conducting analog signals from the electrodes on the top side of baseboard 105 and another plurality of conductive strips along the film 109 on the bottom side of the board. The total number of conductive strips formed out of films 106 and 109 will be at least equal to the number of detector cells from which analog signals must be taken.

The edge of the laminated board assembly in FIG. 10 marked 123 is located in the final assembly where it will overhang the internal chamber 20 of the detector housing, comparable to the way the other embodiment of the board 14 has its gap 63 overhanging the chamber in FIG. 3. Two leads 112 and 113, of the many that extend from the detector cell electrode plates, are shown in FIG. 10 as being connected to the individual conductors located in the board assembly. The leads such as 112 and 113 are connected to alternate conductive strips formed from the copper film 106 and the copper film 109 which are on opposite sides of base insulating board 105. The foremost wire 112 as viewed in FIG. 10 extends, typically, into a hole 115 which passes through all layers. The hole has internal plating 116. Lead wire 112 does not contact any of the conductive strips or lands formed out of copper layer 106 but passes between them. Electrical contact is made, however, with one of the conductive strips in the copper film 109 which is below baseboard 105. Actually, electrical continuity to the top of the board is obtained with plating 116. Thus, there is a continuous conductive path from the typical strip in film 109 up to the pad 117 which is etched from grounding film 108. Lead wire 112 is soldered to pad 117 at 118. A typical adjacent alternate lead wire 113 extends into a through-hole 119 which extends through all layers of the laminated board assembly 114. Because of the staggered relationship of the conductive strips in films 106 and 109, above and below baseboard 105, the lead wire 113 passes through the strip in film 109 but passes between alternate strips in film 106. Electric contact between lead wire 113 and the strip in film 106 is made by the internal plating in hole 119. This plating, of course, is in electrical continuity with pad 120 which is etched from copper grounding film 108. Lead wire 113 is soldered to pad 120 as suggested by the fillet 121. The end of lead wire 113 extends into a pad 122 which is formed by etching grounding copper film 111.

The rows of staggered lead wires such as 30, 31, and 112, 113 for the respective FIG. 6 and FIG. 10 embodiments are connected when the circuit board assembly is deposited over the top surfaces of housing walls 16–19 which define internal housing chamber 20. Both embodiments are handled in the same way. Connecting the lead wires to the multiplicity of conductive strips in the assembly that has conductive strips on one side of the baseboard only as in FIG. 3 is typical.

Referring to FIG. 3, the procedure for connecting the multiplicity of lead wires such as 30 and 31 to the circuit board begins with having the electrode assembly or cell array anchored in chamber 20 of the housing. The lead wires extend straight up at first through the gap or hole 63 in the board assembly 14. The board is deposited on a gasket assembly 125. Cover 11 is, of course, not in place at this time. This provides access for making all the lead wire connections from the top of the circuit board without the cover being in the way which is one of the merits of the invention. The person making the connections then bends the lead wire ends downwardly and inserts them in the proper holes that terminate the conductive strips and solders them consecutively as previously described. When these connections and any others that might have to be made are completed, an upper gasket assembly 126 is deposited on top of the circuit board assembly. This is followed by applying cover 11 and clamping it down with screws 15. The compressed gasket assemblies 125 and 126 on each side of the circuit board assembly 14 results in a sealed joint between the cover and body of the housing.

Figure 9:
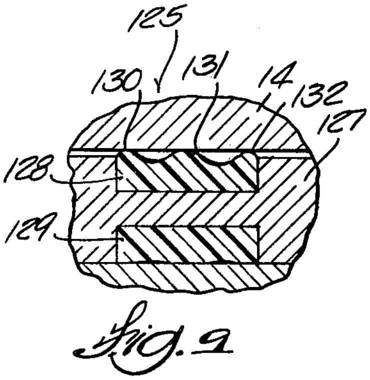
FIG. 9 is a fragmentary isolated sectional view of a gasket assembly which is used between the circuit board and the housing and its cover.

A fragment of a typical gasket assembly 125 is shown in section in FIG. 9. It comprises a metal strip 127 having grooves in its upper and lower surface for accommodating a pair of gaskets 128 and 129 which may be made of neoprene rubber. For the sake of illustration, gasket 128 is shown as having the configuration it has before it is compressed. At that time, it has three longitudinally extending ribs 130, 131 and 132. The ribs define intervening valleys. When the cover is compressed onto the detector housing by tightening screws 15, the gaskets yield and assume the configuration of the one that is marked 129. In other words, the ribs flow or flatten out and obliterate the valleys so that the interfacing surfaces are essentially coplanar.

The compressed gaskets are effective to prevent leakage of gas along the upper and lower surfaces of the circuit board assembly when disposed between the detector cover and housing. However, there is an opportunity for gas to leak if the baseboards such as 105 or 50 have pores in which case gas might eventually migrate to their edges outside of the detector housing. In accordance with the invention, the board assembly is impregnated, at least at its edges and adjacent any openings, with a resin that seals the pores. This is done before the board assembly is placed on the detector housing for making the electric connections. Present practice is to put the boards in a tray and place the tray in a chamber that can be warmed and evacuated. After vacuum has persisted for a while, a previously degassed fluid resin is introduced into the tray so that the vacuum which has been created in the pores will draw the resin in until they are filled. Epoxy resin has been used in practice. Other resins might be used. It has been found that the resin migrates into the board around any edges or openings a distance of 25 to 50 mils, a mil being 0.001 of an inch. The board is removed from the vacuum chamber while the epoxy on its surfaces is still warm and fluid at which time it is wiped off of the major surfaces using toluene, for example, as a solvent. When the board is cleaned up, cooled, and set for a day, it is ready for installation as described above.

After the electrodes which form the cells are connected to the circuit board and the board is sealed by compressing the cover on the detector housing, the detector is evacuated and then filled with an ionizing gas that is suitable for the energy of the radiation photons that are to be detected.

A basic concept of the embodiments of the invention described above is to have thin conductors supported on a board and to dispose the board sealingly and insulatingly between a chamber containing electric elements and a cover so the conductors may serve as leads from the elements. The conductors may be electrically isolated from the cover and chamber with insulating films adhered to the board as described above, but other ways of isolating are also possible and within the scope of the invention. As examples, the conductors on the board could be uncovered and exposed and isolation could be obtained by interposing a separate insulating layer between the cover and board. The gaskets which are used for sealing the board might also be used to obtain electrical isolation between the parts.

Although making a multiplicity of connections from elements in a housing to the outside of the housing with two typical circuit board constructions have been described in considerable detail, such description is intended to be illustrative rather than limiting, for the invention may be variously embodied and is to be limited only by interpretation of the claims which follow.

We claim:

1. A radiation detector comprising a housing for being occupied by ionizable gas at a pressure of several atmospheres and having a closed bottom, wall means defining a chamber having a top opening, and a radiation transmissive window in said housing, an array of detector elements disposed in said chamber and a fine signal wire extending from a plurality of the elements, respectively, said wires being arranged for being accessible through said top opening, a cover for being disposed on said wall means to close said opening and means for pressing said cover toward said wall means with sufficient force to maintain said gas pressure, improved means for establishing electric circuits between the outside of said chamber and said wires inside of said chamber, comprising:

a circuit board including an insulating base layer having an opening for being disposed over the top opening of said chamber to enable said wires to extend through said opening and be accessible from the side of said board which is opposite from a side that is presented toward said chamber, at least one margin of said board surrounding its opening extending over the opening in said chamber and areas of said board around said opening being superimposed over the top of said wall means, a first plurality of conductive strips adhered to said base layer, said strips having corresponding ends terminating outside of said chamber and opposite corresponding ends terminating inside said chamber on said one margin of the opening and having holes and aligned holes in said board for said wires to pass through said board from said chamber to make electric contact with said strips, an insulating layer superimposed over said strips and adhered to said board, and gasket means disposed between said board and wall means and between said board and cover to effectively seal said chamber when said cover is pressed toward said wall means.

2. The circuit board assembly as in claim 1 including metal films, laminated, respectively, to said insulating layer and to a side of said base layer which is opposite to the side having said conductive strips, said films terminating in spaced relation with respect to said corresponding ends of said strips.

3. The circuit board assembly as in claim 1 having outside edges and edges defining said opening in said board impregnated with resin to prevent permeation of gas between the inside and outside of said chamber.

4. The circuit board assembly as in claim 1 including:

a second plurality of thin conductive strips on said insulating base layer on a side opposite thereof from said first plurality of strips for extending from outside of said chamber to its inside and another insulating layer laminated on said strips at least on those portions that are to be disposed between said cover and said chamber wall means, said second strips each having corresponding ends terminating outside of said chamber and opposite corresponding ends terminating inside of said chamber on said one margin and having holes and aligned holes in said board for said wires to pass through from a side of said board opposite from the side that is presented toward said chamber, said ends of said strips on one side of said board being offset relative to ends of said strips on the other side of said board to enable said holes to be spaced and electrically isolated from each other, and pads composed of metal film adhered to the side of said board on which said first plurality of strips is adhered, said pads having holes aligned with the holes in said board and in the ends of said second plurality of strips, said holes being plated internally to establish a conductive path through said board from said pads to the ends of said second plurality of strips to thereby enable some of said wires to be inserted through said holes in the pads and the board from the side opposite of said chamber to enable making contact with the ends of said second strips on the side of said board which is presented toward said chamber.

5. In a radiation detector comprising a housing having a chamber and a cover for being secured on said housing to close said chamber, a plurality of adjacent electrode elements defining cells for being occupied by a gas at a pressure substantially above atmospheric pressure and that is ionizable by radiation entering said chamber for said electrodes to produce electric analog signals corresponding with the intensity of the radiation entering said cells, improved means for transmitting said signals from said electrode elements inside of said chamber to the outside of said chamber, comprising:

a generally planar laminated assembly for being disposed sealingly between said cover and said body and having an opening through all layers, said opening being over said chamber, said assembly including a base layer of insulating material having opposed sides and a plurality of thin conductive strips adjacent each other and supported on a first side of said base layer, said conductive strips extending along said base layer and each of said strips having corresponding ends terminating, respectively, inside of said chamber adjacent said opening and opposite ends terminating, respectively, outside of said chamber, said ends and said base layer having aligned holes, another layer of insulating material laminated over said conductive strips in such manner as to let said terminating ends exposed, and a plurality of wires leading from said electrode elements and extending through said opening in said laminated assembly and back into said holes to permit connecting said wires to said terminating ends of said conductive strips from said one side of said base layer on which said ends are disposed before said cover is disposed over said assembly, another plurality of thin conductive strips extending along said base layer on a side opposite of said first side and each of said other strips having corresponding ends terminating, respectively, inside of said chamber adjacent said opening and opposite corresponding ends terminating, respectively, outside of said chamber, said ends of said strips which terminate inside said chamber being out of alignment with corresponding ends of strips on said first side, said last named ends and the layers having aligned holes coated interiorly with conductive material and some of said lead wires from electrode elements extending through said opening in said laminated assembly and back into said holes from said first side to enable them to be soldered from said first side, sealing means interposed between said laminated assembly and said cover and between said assembly and said housing, and means for pressing said cover to said housing to close said chamber.

6. The laminated assembly as in claim 5 in which at least the edges of said assembly are impregnated with resin.

7. The laminated assembly as in claim 5 wherein said insulating layer on said conductive strips has an opening for exposing said ends of said conductive strips which are outside of said chamber, said terminating ends and the layers under said ends having holes for receiving connector pins.

8. The assembly as in claim 7 including a film of conductive material providing a grounding path and disposed on said insulating layer and on the opposed side of said base layer, respectively, said conductive material film having openings corresponding substantially with the opening in said film.

* * * * *